United States Patent [19]

Hirama et al.

[11] Patent Number: 5,006,953
[45] Date of Patent: Apr. 9, 1991

[54] LEAD TYPE CHIP CAPACITOR AND PROCESS FOR PRODUCING THE SAME

[75] Inventors: Masahiro Hirama; Hiroaki Tanidokoro; Kazuyasu Hikita, all of Saitama, Japan

[73] Assignee: Mitsubishi Mining & Cement Co., Ltd., Tokyo, Japan

[21] Appl. No.: 384,689

[22] Filed: Jul. 25, 1989

[30] Foreign Application Priority Data

Jul. 26, 1988 [JP] Japan ............................ 63-187460

[51] Int. Cl.$^5$ ............................................. H01G 1/14
[52] U.S. Cl. ................................. 361/309; 361/321
[58] Field of Search ............... 361/308, 309, 310, 321; 29/25.42

[56] References Cited

U.S. PATENT DOCUMENTS

| 3,515,958 | 6/1970 | Claypoole et al. | 361/310 |
| 3,612,963 | 10/1971 | Piper et al. | 361/309 X |
| 4,151,579 | 4/1979 | Stark | 361/308 |
| 4,158,218 | 6/1979 | McLaurin et al. | 361/310 X |
| 4,571,276 | 2/1986 | Akse | 361/309 X |
| 4,701,827 | 10/1987 | Fujikawa et al. | 361/309 |

FOREIGN PATENT DOCUMENTS 118322 9/1981 Japan ................................. 361/321

Primary Examiner—Donald A. Griffin
Attorney, Agent, or Firm—Michael N. Meller

[57] ABSTRACT

A lead type chip capacitor which is disclosed herein comprises a capacitor chip having a lead terminal bonded thereto through a joining or bonding layer made of a highly melting metal paste. The lead type chip capacitor is produced by bonding at least one internal electrode in a capacitor chip with a lead terminal by a metal paste, drying them at a temperature in a range of 100° to 200° C., and firing the resulting capacitor chip with the lead terminal bonded thereto at a temperature in a range of 500° to 900° C. in the air or in a nitrogen atmosphere.

1 Claim, 1 Drawing Sheet

LEAD TYPE CHIP CAPACITOR AND PROCESS FOR PRODUCING THE SAME

BACKGROUND OF THE INVENTION

1. Field of the Invention

The present invention relates to a ceramic capacitor and a process for producing the same, and particularly, to a ceramic capacitor with a joining or bonding layer having an improved heat resistance in a lead type chip capacitor and a process for producing the same.

2. Description of the Prior Art

One of electronic parts carried on an electronic apparatus is a ceramic capacitor which is produced by laminating a ceramic dielectric material and an internal electrode. A lead type chip capacitor often comprises a lead terminal 1 mounted at each of opposite ends of a capacitor chip 3 with a joining or bonding layer 2 interposed therebetween, as shown in FIG. 1. The capacitor chip 3 is comprised of a ceramic dielectric material 31 and an internal electrode 32.

For the joining or bonding layer 2 in the lead type chip capacitor, solders having lower melting points have been conventionally used such as Pb-Sn, Pb-Ag and Bi-Sn alloys, any of which have a melting point lower than 400° C. Capacitors having a terminal electrode made of a material such as Ag or Ag/Pd include those having a lead terminal 1 connected by use of a higher melting solder.

Because any of these solders has a melting point lower than 400° C. as described above, however, the following troubles have been often encountered: In soldering the lead terminal 1 for mounting onto a circuit substrate, heat may be transmitted through the lead terminal 1 to heat and melt the joining layer 2. As a result, the lead terminal 1 bonded to the joining layer 2 may be peeled off, or when an electronic apparatus having a lead type chip capacitor mounted thereon is in service, a circuit may be heated to a higher temperature, with a result that the lead terminal 1 bonded to the joining layer 2 may be likewise peeled off.

Further, when a high melting solder is used, there is a fear that heat causes a mechanical stress to be applied to a capacitor chip, whereby the latter may be broken.

SUMMARY OF THE INVENTION

Thereupon, the present inventors have made various studies from other viewpoints rather than use of a series of soldering techniques as described above and consequently, have found the use of metal pastes to accomplish the present invention.

Therefore, it is a first object of the present invention to provide a lead type chip capacitor having an excellent heat resistance and a high reliability.

It is a second object of the present invention to provide a process for producing a lead type chip capacity as described above, which is capable of economically producing the capacitor in a simple producing procedure.

The first object is attained by providing a lead type chip capacitor comprising a capacitor chip having a lead terminal bonded thereto through a joining or bonding layer made of a highly melting metal paste.

The second object is attained by providing a process for producing a lead type chip capacitor, comprising steps of bonding at least one internal electrode in a capacitor chip with a lead terminal by a metal paste, subjecting them to drying at a temperature in a range of 100° to 200° C., and firing the resulting capacitor chip with the lead terminal bonded thereto at a temperature in a range of 500° to 900° C. in the air or in a nitrogen atmosphere.

With the above lead type chip capacitor, the joining or bonding layer is free of any metal having a lower electric conductivity and hence, the capacitor has excellent high frequency characteristics and thus, can be also used as a high frequency power capacitor.

In addition, with the above process, the metal paste is used to bond the capacitor chip and the lead terminal, in place of the solder used in the prior art. Therefore, in soldering of the capacitor to a circuit substrate or the like, the joining or bonding layer between the capacitor chip and the lead terminal cannot be molten to cause peeling-off of the lead terminal. In addition, when an electronic apparatus having the capacitor mounted thereon is in service, the joining layer cannot be molten due to generation of a heat. Accordingly, it is possible to provide a lead type chip capacitor having an excellent heat resistance by use of only a firing apparatus without using any complicated soldering device, attendant with an effect that the producing process is simplified, highly efficient and economical.

DETAILED DESCRIPTION OF THE PREFERRED EMBODIMENTS

Figure 1:
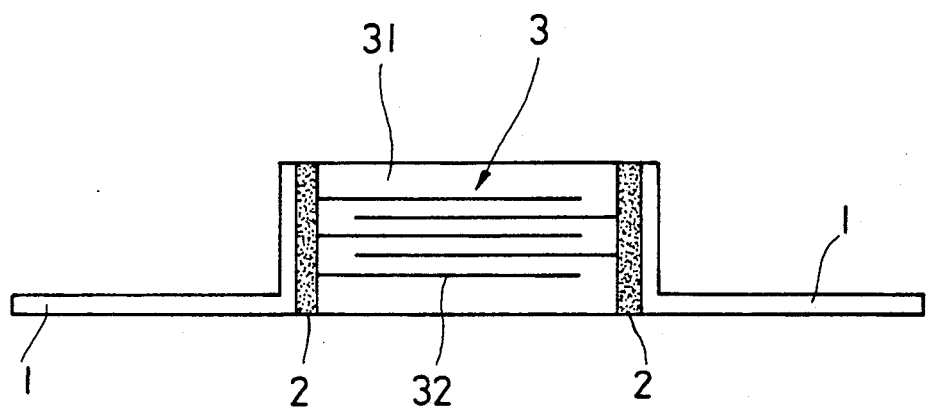
FIG. 1 is a sectional view of a conventionally known typical lead type chip capacitor.

The present invention will now be described by way of preferred embodiment.

A composition forming a metal paste for use in the present invention essentially comprises a metal powder and an organic binder and may contains a solvent for the organic binder and optionally, a glass powder and a dispersant and the like respectively in small amounts.

Metals which may be used as a primary component for the metal paste in accordance with the present invention include powders of metals and metal alloys such as Ag, Cu, Ag/Pd, and Pt.

Illustrative of the organic binders which may be used are celluloses such as methyl-, ethyl-, and nitro-celluloses, and polymers such as polyethylene, vinyl acetates, polyvinyl butyral, acrylic resins, and methacrylic resins.

Examples of the solvents for the organic binder are those such as methyl cellosolve, butylcarbitol, α-terpinenol and the like, which are commonly used in the art.

Glass powders which may used include glasses of lead borosilicate, lead borate, zinc borosilicate and the like.

A powder of metal or metal alloy may be mixed with a glass powder in an amount of 5 to 25 parts by weight and an organic binder in an amount of 5 to 35 parts by weight both per 100 parts of the powder of metal or metal alloy.

The lead terminal may be formed using a wire-, film- or plate-like material of Ag, Cu, Al, Au or Pt, but in view of an aconomy, it is preferred to use a material of Cu plated with Ag, Au or Pt.

The capacitor chip used may be any of those commonly used in the art, for example, including those made by alternately laminating ceramic dielectric materials and internal electrodes and firing the resulting laminate.

TABLE 1

|  | Example No. | | | | |
| --- | --- | --- | --- | --- | --- |
|  | 1 | 2 | 3 | 4 | Comp. Ex. |
| Internal electrode | Ag/Pd | Ag | Ag | Cu | Ag |
| Type of capacitor | Monolithic fired type capacitor | Superposed, bonded type alumina cap. | Superposed, bonded type alumina cap. | Superposed, bonded type alumina cap. | Superposed bonded alumina cap. |
| Metal paste | Ag paste* | Ag paste | Cu paste** | Cu paste | Solder |
| Lead terminal | Ag ribbon | Cu ribbon | Cu ribbon | Cu ribbon | Cu ribbon |
| Firing atmosphere | in the air | in nitrogen | in nitrogen | in nitrogen | — |
| Drying temp. (°C.) | 100 to 200 | 100 to 200 | 100 to 200 | 100 to 200 | — |
| Firing temp. (°C.) | 850 | 750 | 600 | 600 | — |

*Ag paste: S-12995 available from Showa chemical Co., ltd.
**Cu paste: QS-190 available from du Pont de Nemours E.I. & Co.
Cap. = Capacitor
Temp. = Temperature The lead type chip capacitor according to the present invention may be produced by bonding a capacitor chip and a lead terminal by a metal paste. Such production will be described below in detail.

Internal electrodes at opposite ends of a capacitor chip are bonded with lead terminals by a metal paste, and then, they are dried at a temperature of 100° to 200° C. This results in the lead terminals secured to the opposite ends of the capacitor chip, respectively.

Subsequently, the resultant chip is fired in the air or in a nitrogen atmosphere at a temperature of 500° to 900° C. for ½ to 2 hours. As a result, the lead terminals are firmly joined or bonded to the capacitor chip without damaging the characteristics of the capacitor chip, thereby providing a lead type chip capacitor.

The lead type chip capacitor produced in this manner according to the present invention has a very good heat stability and therefore, is useful for an electronic apparatus which is used at an increased temperature, and an electronic apparatus manufactured through repeating of soldering, as well as an electronic apparatus having a high power output circuit which is liable to generate a heat.

EXAMPLES

The present invention will be described below in detail by way of Examples which are intended to illustrate the invention but not to limit the invention.

Examples 1 to 4

A lead type chip capacitor was produced using materials and conditions as given in Table 1 and according to the following procedure. More specifically, a lead terminal was bonded to each of internal electrodes exposed at opposite ends of a capacitor chip by use of a metal paste, and the resulting capacitor chip with the lead terminals bonded thereto was dried for two hours. After completion of the drying, it was fired in the air or in a nitrogen atmosphere for one hour.

The lead type chip capacitors produced using the materials and conditions given in Table 1 were left to stand at an increased temperature of 500° C. for 10 hours and then observed for surface appearances thereof. As a result, with the lead type chip capacitor in Comparative Example, it was observed that the joining or bonding layer between the lead terminal and the capacitor chip was peeled off, whereas those in Examples 1 to 4, there were not observed any abnormality such as peeling off of the lead terminals from the joining layer between the lead terminals and the capacitor chip, and cracks in the capacitor chip.

This indicates that with the lead type chip capacitor made using the metal paste according to the present invention, the lead terminals were firmly bonded to the chip with a high bond strength. This also indicates that there was provided a satisfactory lead type chip capacitor with no cracks produced in the capacitor chip itself.

Moreover, the lead type chip capacitor according to the present invention has excellent high frequency characteristics as with a chip capacitor having no lead terminal, because it does not contain any metal having a lower electric conductivity in the joining layer.

Further, various capacitors were produced in the same manner as in Examples, except for use of Ag/Pd (70:30) [D-4302 available from Showa Chemical Co., Ltd.], and as a result, products were obtained having effects of the present invention.

What is claimed is:

1. A lead type chip capacitor comprising a capacitor chip having a lead terminal bonded thereto through a joining or bonding layer made of a highly melting metal paste, wherein said metal paste comprises a metal powder and an organic binder, said organic binder being a cellulose selected from the group consisting of methyl-, ethyl-, and nitro-cellulose and a polymer from the group consisting of polyethylene, vinyl acetates, polyvinyl butyral, acrylic resins and methacrylic resins.

* * * * *